United States Patent
Raucher et al.

(10) Patent No.: US 11,537,353 B2
(45) Date of Patent: Dec. 27, 2022

(54) COMBINED DISPLAY FOR SHARING A MULTI-SCREEN EMERGENCY APPLICATION

(71) Applicant: RapidDeploy, Inc., Austin, TX (US)

(72) Inventors: Steven Raucher, Austin, TX (US); Philip Johannes Cornelis Nel, Western Cape (ZA)

(73) Assignee: RapidDeploy, Inc., Austin, TX (US)

( * ) Notice: Subject to any disclaimer, the term of this patent is extended or adjusted under 35 U.S.C. 154(b) by 0 days.

(21) Appl. No.: 17/226,422

(22) Filed: Apr. 9, 2021

(65) Prior Publication Data

US 2022/0326902 A1    Oct. 13, 2022

(51) Int. Cl.
| | | |
|---|---|---|
| G06F 3/14 | (2006.01) | |
| H04M 3/51 | (2006.01) | |
| H04N 7/15 | (2006.01) | |
| G06F 3/0486 | (2013.01) | |

(52) U.S. Cl.
CPC .......... *G06F 3/1454* (2013.01); *G06F 3/0486* (2013.01); *H04M 3/5116* (2013.01); *H04N 7/155* (2013.01)

(58) Field of Classification Search
None
See application file for complete search history.

(56) References Cited

U.S. PATENT DOCUMENTS

| | | | | |
|---|---|---|---|---|
| 2004/0252185 | A1* | 12/2004 | Vernon | G06Q 10/10 348/14.08 |
| 2010/0037151 | A1* | 2/2010 | Ackerman | H04L 65/4015 715/753 |
| 2014/0019882 | A1* | 1/2014 | Chew | H04L 65/40 715/753 |
| 2018/0341374 | A1* | 11/2018 | Faulkner | H04N 7/152 |
| 2019/0166330 | A1* | 5/2019 | Ma | H04L 65/403 |
| 2019/0258392 | A1* | 8/2019 | Youngberg | H04N 21/472 |
| 2020/0042945 | A1* | 2/2020 | Schuler | G06Q 10/10 |
| 2021/0126915 | A1* | 4/2021 | Lakoumentas | G06F 3/1438 |

* cited by examiner

*Primary Examiner* — Stella L. Woo
(74) *Attorney, Agent, or Firm* — Patent Capital Group

(57) ABSTRACT

A multi-display capture system receives user selections of two or more display areas, such as screens or application windows, generated by a computing device. The multi-display capture system simultaneously captures a video stream of each of the selected display areas. In another display area, the multi-display capture system outputs a combined display that includes each of the captured video streams. The user may select a video stream to enlarge, and the multi-display capture system enlarges the video streams while continuing to display the other video streams. The combined display may be shared with one or more other users.

14 Claims, 14 Drawing Sheets

COMBINED DISPLAY FOR SHARING A MULTI-SCREEN EMERGENCY APPLICATION

BACKGROUND

Existing screen-sharing tools, such as videoconference applications, provide the ability for a user to share a computer screen or window with other users. Many applications are arranged in a single window (e.g., a word processing application or a web browser) that fits on a single screen; such application can be readily shared using existing screen-sharing tools. However, some applications, such as 9-1-1 call handling and dispatching software, generate multiple display windows that are displayed simultaneously, e.g., across multiple screens. For example, a typical 9-1-1 telecommunicator's setup may include a first screen that displays an incident map showing the location of active incidents, a second screen that displays an incident grid listing incidents handled by the telecommunicator or the telecommunicator's call center, a third screen that displays a units grid listing units available for the telecommunicator to dispatch, and a fourth screen that displays details of a particular incident. The full multi-screen call handling and dispatch environment cannot be effectively shared using existing screen-sharing tools.

DESCRIPTION OF EXAMPLE EMBODIMENTS OF THE DISCLOSURE

Overview

Figure 1:
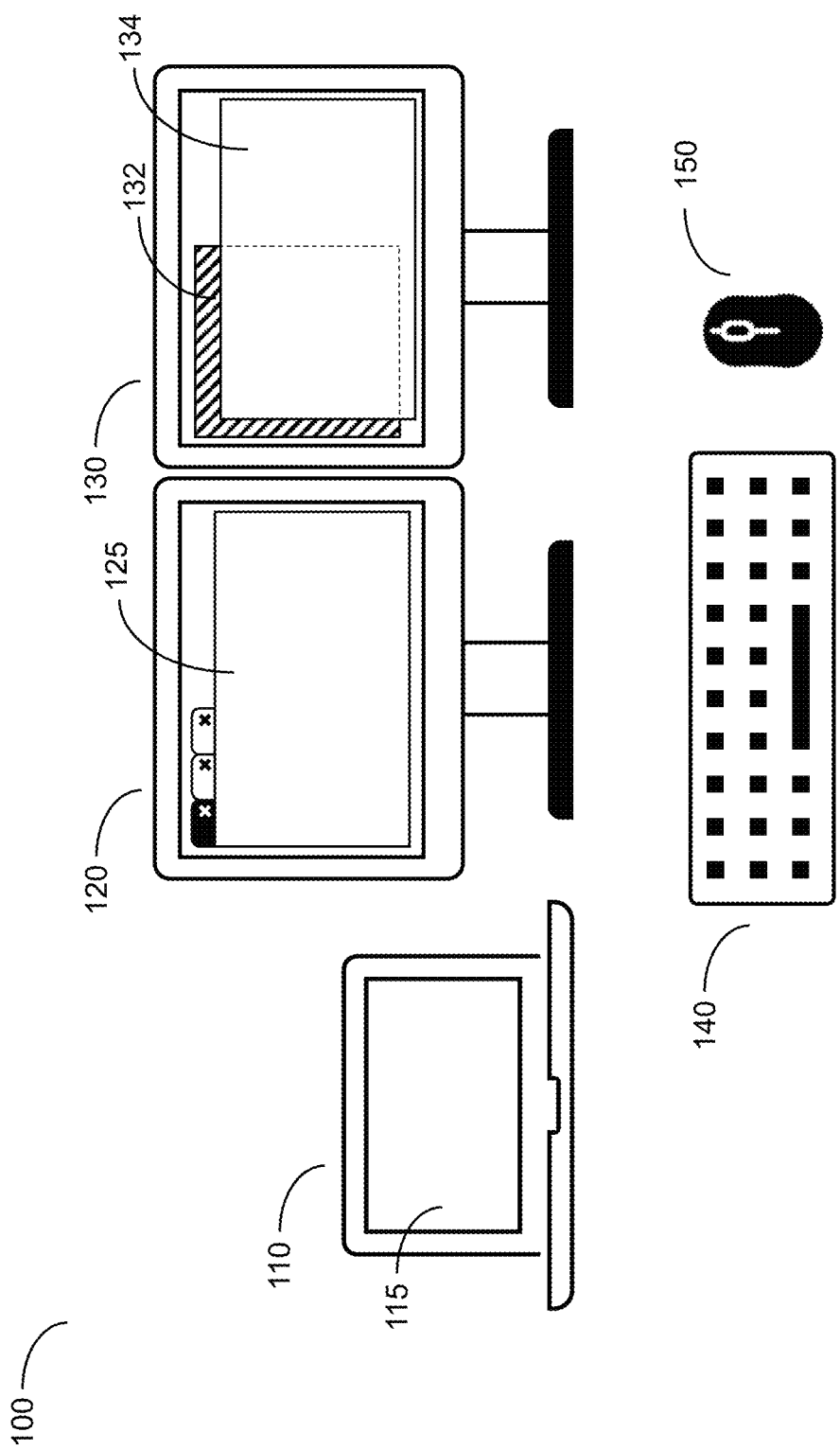
FIG. 1 illustrates a multi-screen system environment according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

As noted above, existing screen-sharing software allows one user (referred to as a "sharing user" or "sharer") to share a single computer screen or window to another user (referred to as a "viewing user" or "viewer"). For example, if a user's computer setup has multiple screens, a user can select one of the screens to share. As another example, if the user has multiple programs opened, each in a different window, the user can select one program window to share.

Some computer applications extend over multiple windows or onto multiple screens, and previous screen-sharing software could not effectively share a view of such applications to a viewing user. For example, the sharing user may switch back and forth between different screens or windows, but this is cumbersome for the sharer, and it is difficult for viewers to follow. Alternatively, a sharing user can group multiple application windows onto different portions of a single screen, manually resizing the windows so that each is visible and non-overlapping, and then share the single screen. However, this approach is also cumbersome for the user to set up. Furthermore, resizing windows so that they fit on a single screen often results in reduced visibility due to windows that are typically displayed across full screens. For example, if an application includes a map window and a call list window, manually arranging these windows onto a single screen changes the window shapes, which may negatively impact the display, e.g., hiding some columns on the call list, or reducing the map size and/or map features. In addition, if the sharing user wants to point out a particular feature, it can be challenging for the viewing user to see the feature in a small window size, particularly if the contents shrink to the size of the window.

The multi-display capture system described herein allows a sharing user to select multiple display areas to simultaneously capture. The multi-display capture system captures each of the selected display areas and generates a combined display of the selected display areas that can be shared with a viewing user. The multi-display capture system enables a sharing user to highlight and enlarge a particular display area, while continuing to provide images of each of the selected display areas. The continual display of each of the selected display areas enable a viewing user to easily follow along with a presentation of a complex, multi-window application.

The sharing user may enter a label for each display area, and the multi-display capture system includes the labels in the combined display. For example, if the sharing user is sharing multiple windows or screens of an emergency dispatch application, the sharing user may select a map interface as a first display area and input the label "Incident Map," and select an incident grid interface as a second display area and input the label "Incident List." The capture system continually captures each of the selected display areas and generates, in another display area (e.g., an application window of the multi-display capture system), a combined display that includes each of the selected display areas along with the labels entered by the user. The combined display shows any changes to the any of the captured display areas in real-time. For example, if the incident map changes (e.g., a new incident is included on the map), the combined display reflects the change in real-time. If, at the same time, the new incident is added to the incident list, the combined display reflects both the changes to the incident map and the incident grid. The combined display enables a viewing user to see all of the display areas of a multi-screen or multi-window application, and to view interactions between different display areas.

The capture system may provide different arrangements of the captured display areas and enable the sharing user to switch between different arrangements. For example, the capture system may enlarge a selected one of the captured display areas, while displaying each of the captured display areas in smaller tiles along and edge of the combined display. By continuing to display each of the captured display areas, even when zooming in on a particular display area, a viewer can continually see the full context of a multi-screen application. The sharing user can share the combined display with another user, e.g., by sharing the combined display area with a viewing user in real-time, or by capturing a video of the combined display and sending the video to the viewing user.

As used herein, a "display area" is a user interface component, such as a screen, an application window, the contents associated with a tab, a portion of an application window (e.g., a dialog box, menu, or another widget), or another portion of a display generated by a computing device. In some embodiments, the multi-display capture system may allow a user to select a portion of a screen or portion of a window using a cursor, e.g., to select any rectangular portion of a screen. In some embodiments, a display area includes a display or portion of a display generated a connected device; for example, a multi-display capture system running on a desktop computer may retrieve a display area from a mobile device (e.g., a tablet or smartphone) in communication with the desktop computer (e.g., plugged into the desktop computer via a USB cable, or connected to the desktop computer via Wi-Fi or Bluetooth). As another example, a video stream captured by a camera, such as a web cam integrated into or connected to the computing device, may be a display area.

In one aspect, a method for generating a combined display comprises receiving a user selection of a first display area of an emergency dispatch application executing on a computing device; receiving a user selection of a second display area of the emergency dispatch application; simultaneously capturing a first video stream of the first display area and a second video stream of the second display area; in a third display area generated by the computing device, providing a combined display comprising the first video stream and the second video stream; receiving a user selection of one of the first video stream and the second video stream; and, in response to the user selection, enlarging a size of the selected video stream in the third display area. In some aspects, the method for generating the combined display is embodied on a non-transitory computer-readable storage medium.

In another aspect, a method for generating a combined display includes receiving a user selection of a first display area generated by a computing device; receiving a user selection of a second display area generated by the computing device; simultaneously capturing a first video stream of the first display area and a second video stream of the second display area; in a third display area generated by the computing device, providing a combined display comprising the first video stream and the second video stream; receiving a user selection of one of the first video stream and the second video stream; and, in response to the user selection, enlarging a size of the selected video stream in the third display area. In some aspects, the method for generating the combined display is embodied on a non-transitory computer-readable storage medium.

In another aspect, a multi-display capture system includes a memory and processing circuitry. The multi-display capture system includes a user selection module to receive a user selection of a first display area and a user selection of a second display area; a display area capture module to simultaneously capture a first video stream of the first display area and a second video stream of the second display area; a display assembler to generate a combined display comprising the first video stream and the second video stream and enlarge a size of one of the first video stream and the second video stream in response to a user selection; and a user control module to receive the user selection of one of the first video stream and the second video stream.

As will be appreciated by one skilled in the art, aspects of the present disclosure, in particular aspects of capturing multiple display areas and generating a combined, shareable display, described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, microcode, circuit designs, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art.

Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Multi-Screen Computer Environment

FIG. 1 illustrates a multi-screen system environment according to some embodiments of the present disclosure. The environment 100 includes a computer 110, two connected display devices 120 and 130, and user input devices 140 and 150. In this example, the computer 110 is represented as a laptop computer that includes an integrated display 115 and integrated user input devices (e.g., a keyboard and trackpad), but in other examples, the computer 110 may be a desktop computer connected to various peripheral devices, such as the display devices 120 and 130 and the input devices 140 and 150. The user input devices connected to the computer 110 include a keyboard 140 and a mouse 150. In other examples, additional or alternative input devices may be used.

The computer 110 contains various processing circuitry, such as a central processing unit (CPU) and a graphical processing unit (GPU). The computer 110 further includes a main memory and a storage unit. The processing circuitry, memory, and storage unit are connected via a bus. The computer 110 may further include one or more video cameras (e.g., an integrated web cam), or a camera may be included in the environment 100 and connected to the computer 110 as an additional peripheral device. The processing circuitry of the computer 110 executes instructions stored in the memory (e.g., program code or software) for causing the computer to perform any one or more of the methodologies or processes described herein. For example, the computer 110 may implement the multi-display capture system described with respect to FIG. 2 to generate any of the example displays shown in FIGS. 3-14.

In this example, the computer 110 includes the integrated display 115 and is connected to two additional display devices 120 and 130. The computer 110 may generate different images for each of the display devices, e.g., displaying different images on each of the displays 115, 120, and 130. For example, a user may instruct the computer 110 to display one application on the laptop screen 115, another application on the display device 120, and another application on the display device 130. In some examples, two or more displays may show different aspects or elements of a single application, e.g., different windows of a computer-aided dispatch (CAD) application. In some embodiments, each display may include different instances of the same application, e.g., the displays 115 and 120 may each display a different word-processing document, or a different browser window. The user can maximize, minimize, and re-size windows on each of the displays 115, 120, and 130.

In the example shown in FIG. 1, the computer 110 is displaying a tabbed application 125 on the display device 120. For example, the tabbed application 125 may be a web browser, and each tab corresponds to a web page. As another example, the tabbed application 125 is a spreadsheet application, and each tab corresponds to a different sheet. In FIG. 1, three tabs are open, and the first tab is selected, causing the contents of the first tab to be displayed in the window below the tabs. If the user selects another tab (e.g., using the keyboard 140 or mouse 150), and the computer 110 displays the contents of the selected tab in the window.

In the example shown in FIG. 1, the computer 110 is also displaying two overlapping display areas 132 and 134 on the display device 130. The display areas 132 and 134 may be two different windows, e.g., windows of two different application, or different instances of the same application. The display area 134 overlays the display area 132, blocking a portion of the display area 132 from view. The outline of the blocked portion of the display area 132 is shown with dashed lines. In other examples, a display area may be fully blocked by another display area.

The environment 100 is merely exemplary. The multi-display capture system described herein may be implemented by a computer connected to more, fewer, or different displays; to more, fewer, or different user input devices; or to any other peripheral devices. In some embodiments, the multi-display capture system may be implemented on a standalone computer (e.g., a laptop or a tablet) that is not connected to any peripheral devices. Notably, in some embodiments, the multi-display capture system can capture images of display areas that are not presently displayed on a screen, e.g., display areas that are blocked by other display areas, or display areas that are minimized. For example, the multi-display capture system may capture the full display area 132, including the portion of this area that is blocked from view on the display device 130 by the display area 134. In some embodiments, the multi-display capture system may capture display areas generated by other devices, such as a mobile device (e.g., a smartphone or tablet) connected to the computer 110, or an image received from a web cam.

Example Multi-Display Capture System

Figure 2:
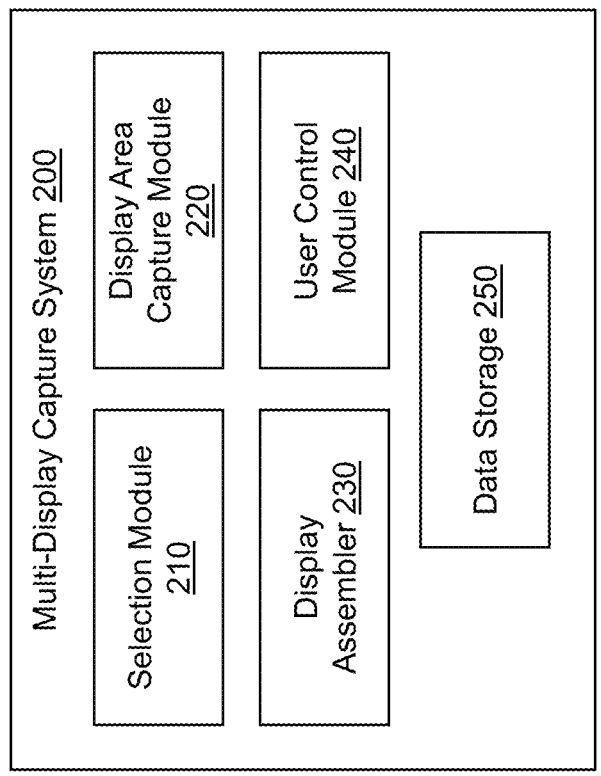
FIG. 2 is a block diagram of a multi-display capture system according to some embodiments of the present disclosure.

FIG. 2 is a block diagram of a multi-display capture system 200 according to some embodiments of the present disclosure. The multi-display capture system 200 includes a selection module 210, a display area capture module 220, a display assembler 230, a user control module 240, and data storage 250. In alternative configurations, different and/or additional components may be included in the multi-display capture system 200. Additionally, functionality described in conjunction with one or more of the components shown in FIG. 2 may be distributed among the components in a different manner than described in conjunction with FIG. 2 in some embodiments.

The multi-display capture system 200 may a be multi-display capture application that can be executed by the computer 110. In such embodiments, the computing device (e.g., the computer 110) running the multi-display capture system 200 displays an application window for the multi-display capture application; the application window enables a user to select display areas to capture and outputs a combined display of the selected areas. In some use cases, the user may then share the combined display generated by the multi-display capture application to one or more viewing users using another application, such as a screen-sharing feature of a videoconferencing application. In some embodiments, the multi-display capture system 200 is a component or module of another application, such as a videoconferencing application. For example, a videoconferencing application includes a multi-display capture utility that enables a user to select multiple display areas and generates a combined display for sharing to other users in a video conference. The videoconferencing application may generate a video stream of the combined display and transmit the video stream over a network (e.g., the Internet) to the viewing user(s). In some embodiments, the combined display may be transmitted to a viewing user's device even if the combined display is not visible on the sharing user's screen, e.g., if the combined display is behind another display area that blocks the combined display from view on the sharing user's computer.

The selection module 210 enables a user to select multiple display areas to include in a combined display. The selection module 210 identifies a set of available display areas and provides a user interface with selectable options for the display areas. The selection module 210 may interact with a screen management utility, window management utility, or other type of display or application manager executed by the computer 110 to identify the available display areas. For example, an application manager of the computer's operating system may provide data describing all open application windows to the selection module 210. In some embodiments, a particular application may provide data describing the windows or tabs open for that application; for example, a browser application may provide data describing all open tabs to the selection module 210. Alternatively, if the operating system does not provide data describing individual tabs, a user may open different tabs that the user wants to share (e.g., different browser tabs) in separate windows.

The selection module 210 receives input from the user indicating a selected subset of the available display areas. In some embodiments, the selection module 210 provides an option for a user to enter a label for each selected display area. For example, in response to receiving a selection of one of the display areas, the selection module 210 provides a text input box in which the user can type a label for the selected display area. The user may input a respective label for each selected display area, and the labels are stored in memory for use by the display assembler 230. In some embodiments, the selection module 210 stores the labels in data storage 250 between sessions, as described further below.

Figure 3:
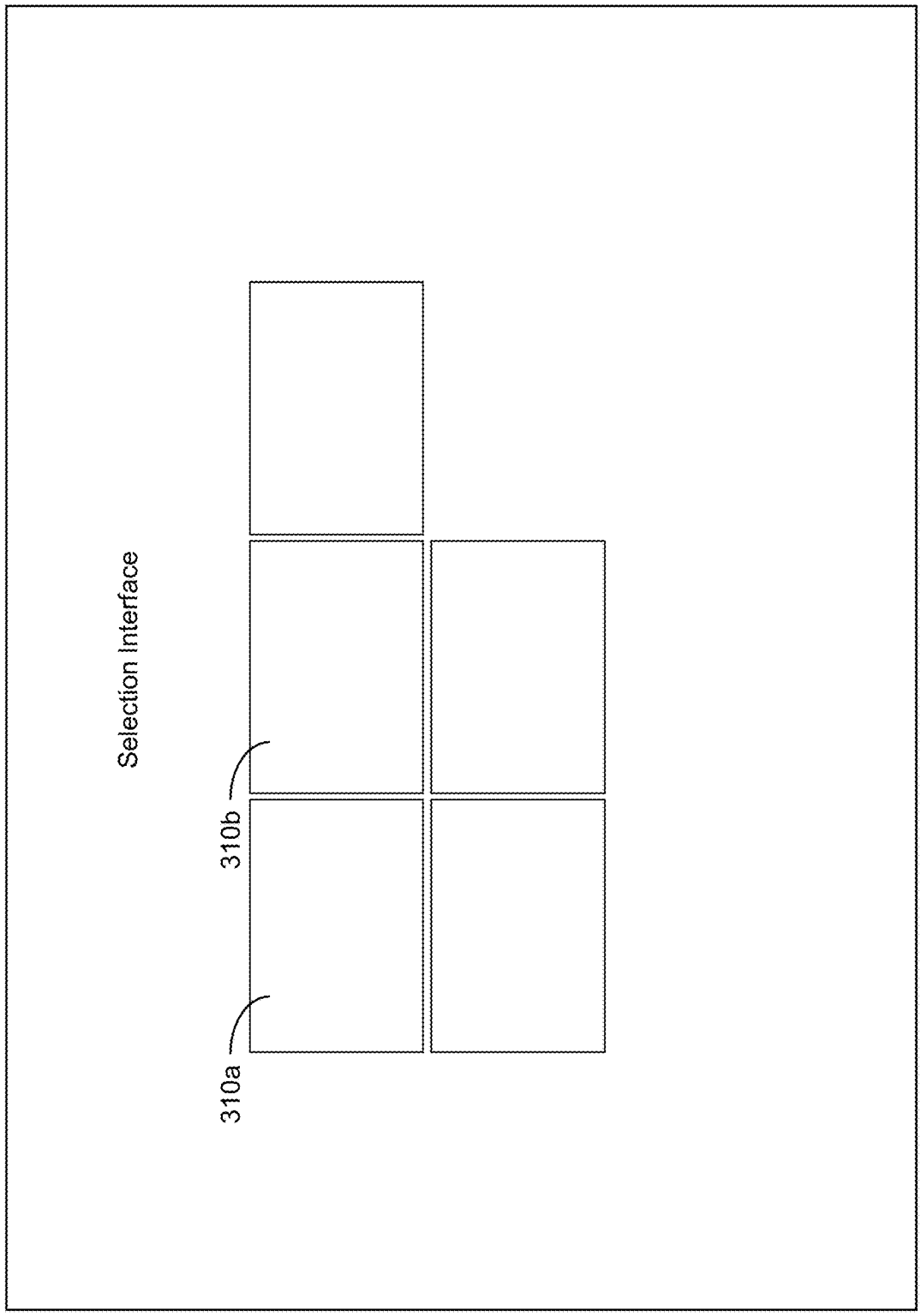
FIG. 3 is an example wireframe of a selection interface according to some embodiments of the present disclosure.
Figure 4:
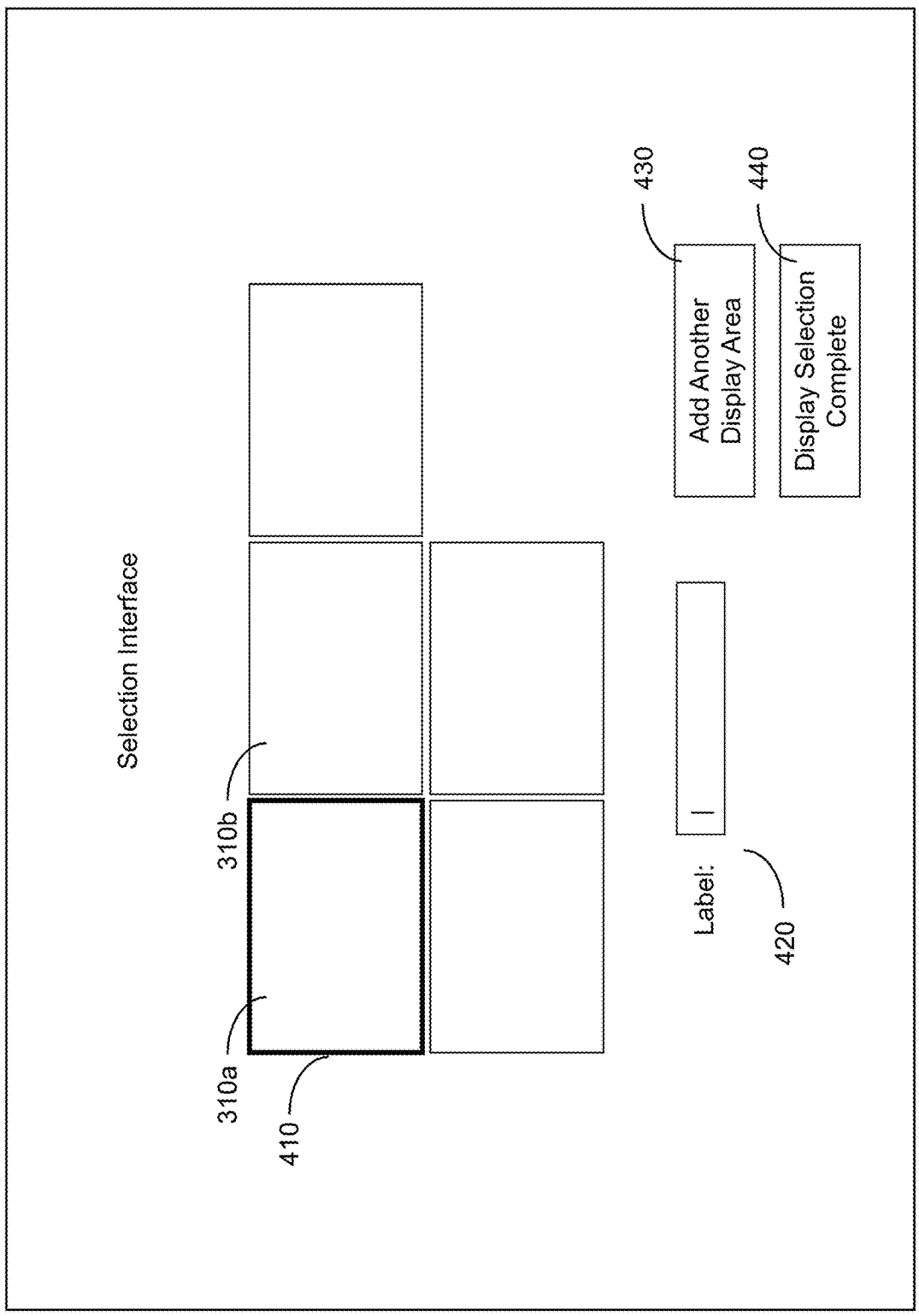
FIG. 4 is an example wireframe of the selection interface after a display area has been selected according to some embodiments of the present disclosure.
Figure 5:
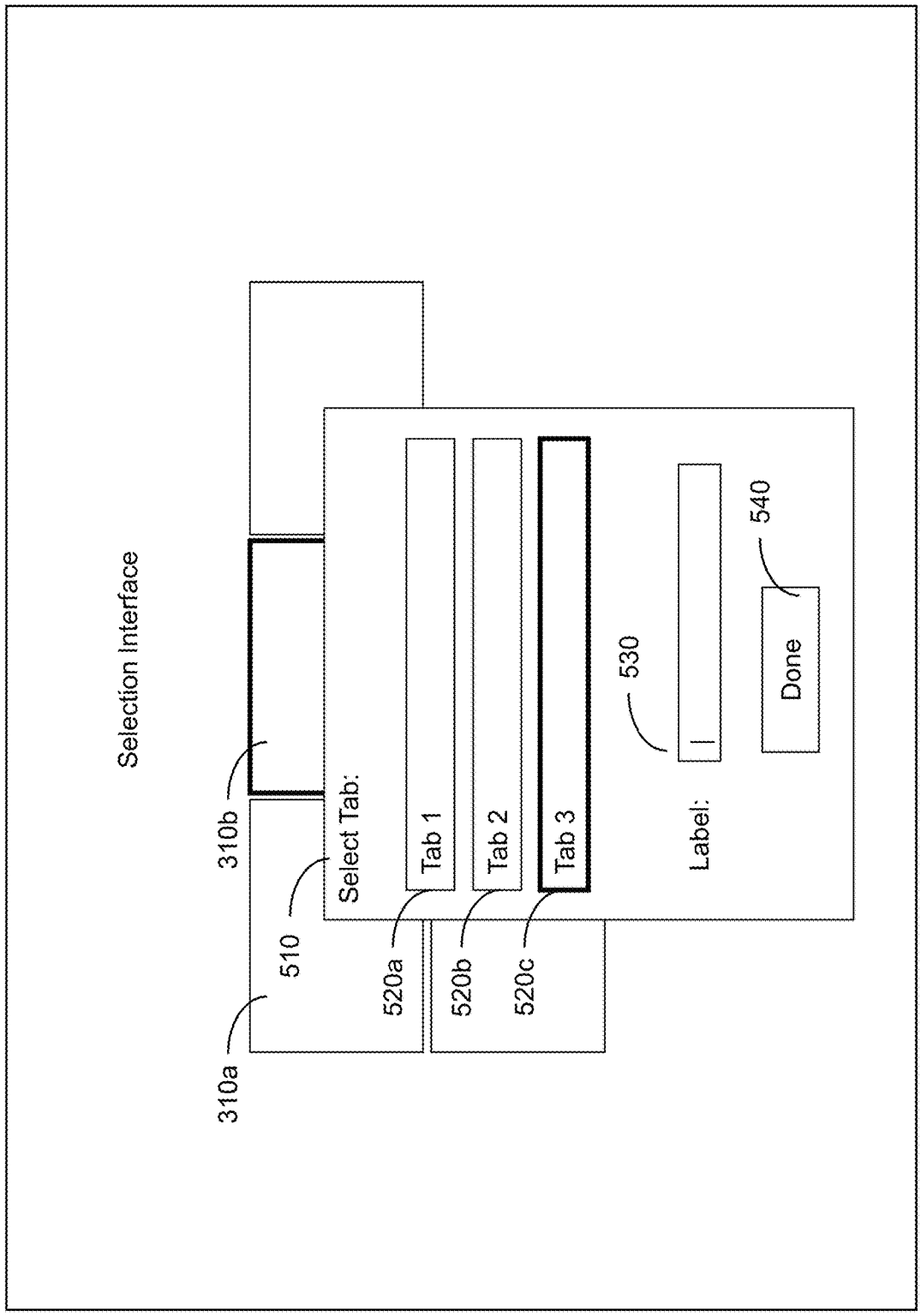
FIG. 5 is an example wireframe of a user interface for selecting a tab of a tabbed application according to some embodiments of the present disclosure.

When the user opens the multi-display capture application, or selects to open a multi-display capture feature of another application (e.g., a videoconferencing application), the selection module 210 may display a selection interface. Example selection interfaces provided by the selection module 210 are shown in FIGS. 3-5. After the user has selected a initial set of display areas, the user may add or remove display areas, as described further with respect to the user control module 240.

The display area capture module 220 captures images of each of the selected display areas. The display area images may change over time as the programs included in the selected display as are executing. The display area capture module 220 may capture a video stream of each of the selected display areas, where the video stream reflects in real-time any changes to the selected display areas. In some embodiments, the display area capture module 220 captures both image and audio data; for example, if the user has selected a particular application window as one of the display areas, the display area capture module 220 captures an image stream of the application window and any sounds associated with the application window. Alternatively, the display area capture module 220 may capture all audio output by the computer 110. In other embodiments, the display area capture module 220 captures only image data. In some embodiments, the display area capture module 220 may utilize a screen capture utility of the computer 110, e.g., receiving a set of specific video streams from the screen capture utility. For example, if the computer 110 is running a Windows operating system, the display area capture module 220 may use Windows Graphic Capture application programming interface (API) to capture video streams of the selected display areas.

Figure 6:
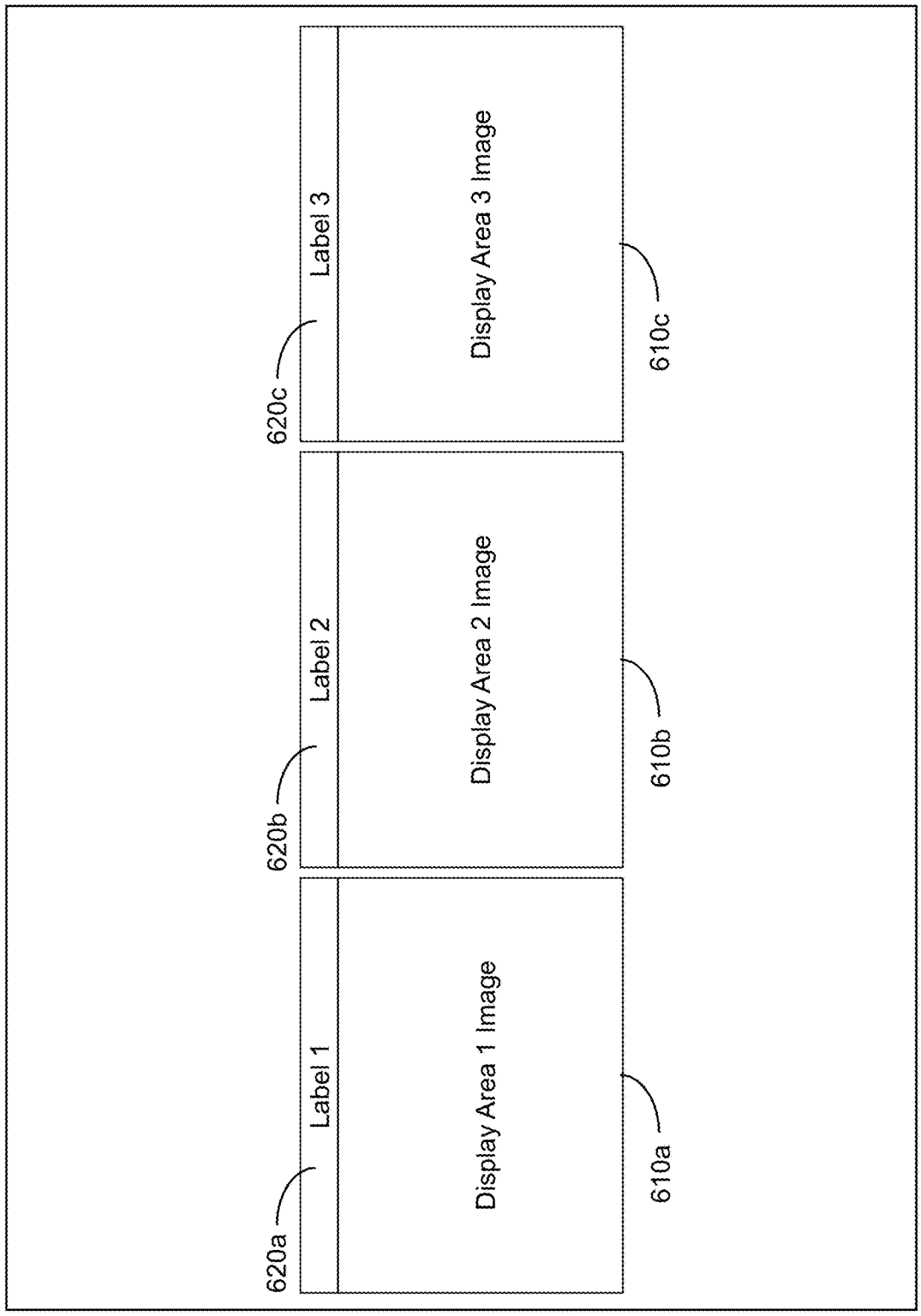
FIG. 6 is an example wireframe of a user interface simultaneously displaying multiple display areas in a horizontal row according to some embodiments of the present disclosure.
Figure 7:
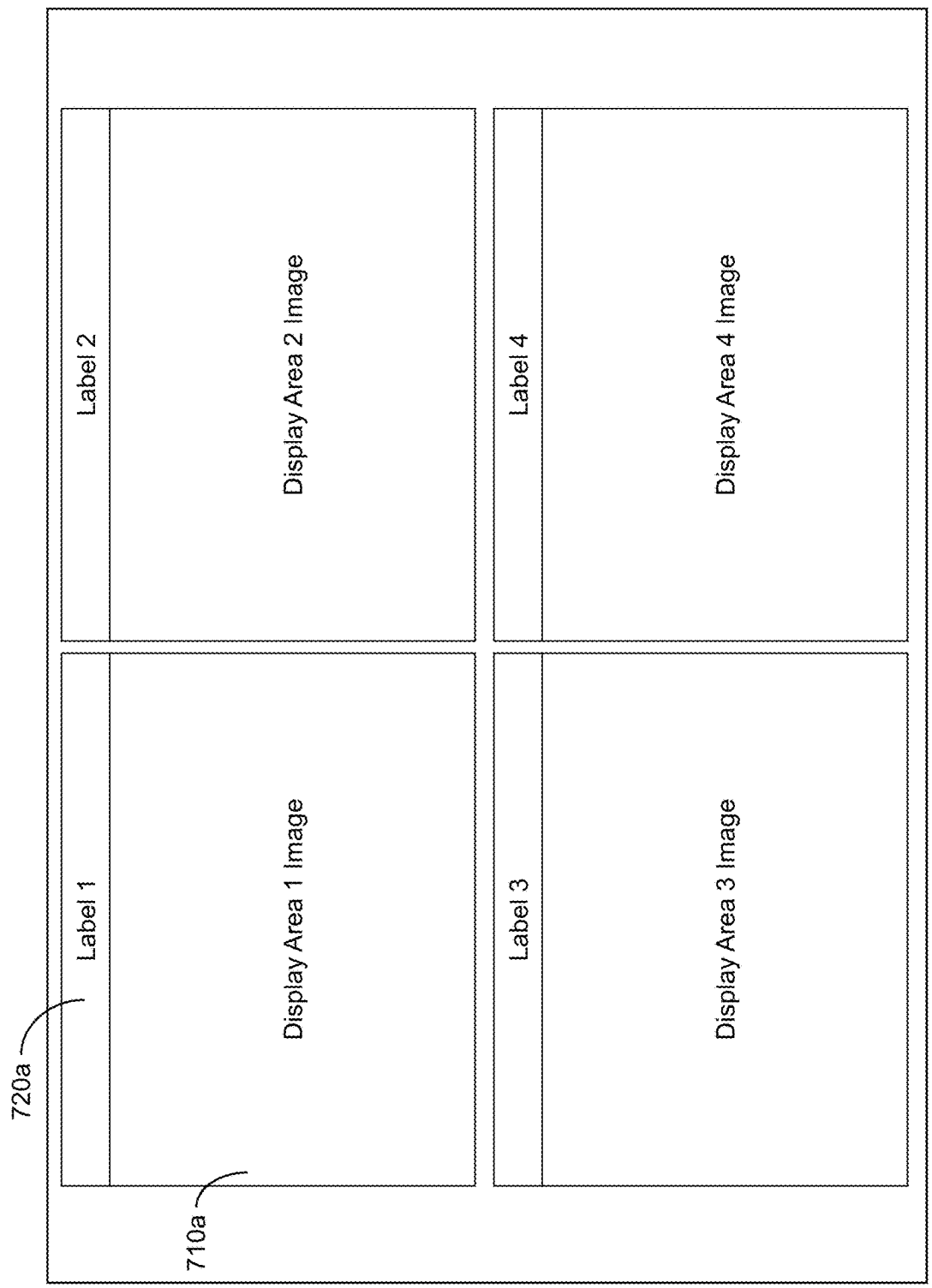
FIG. 7 is an example wireframe of a user interface simultaneously displaying multiple display areas in a grid arrangement according to some embodiments of the present disclosure.
Figure 9:
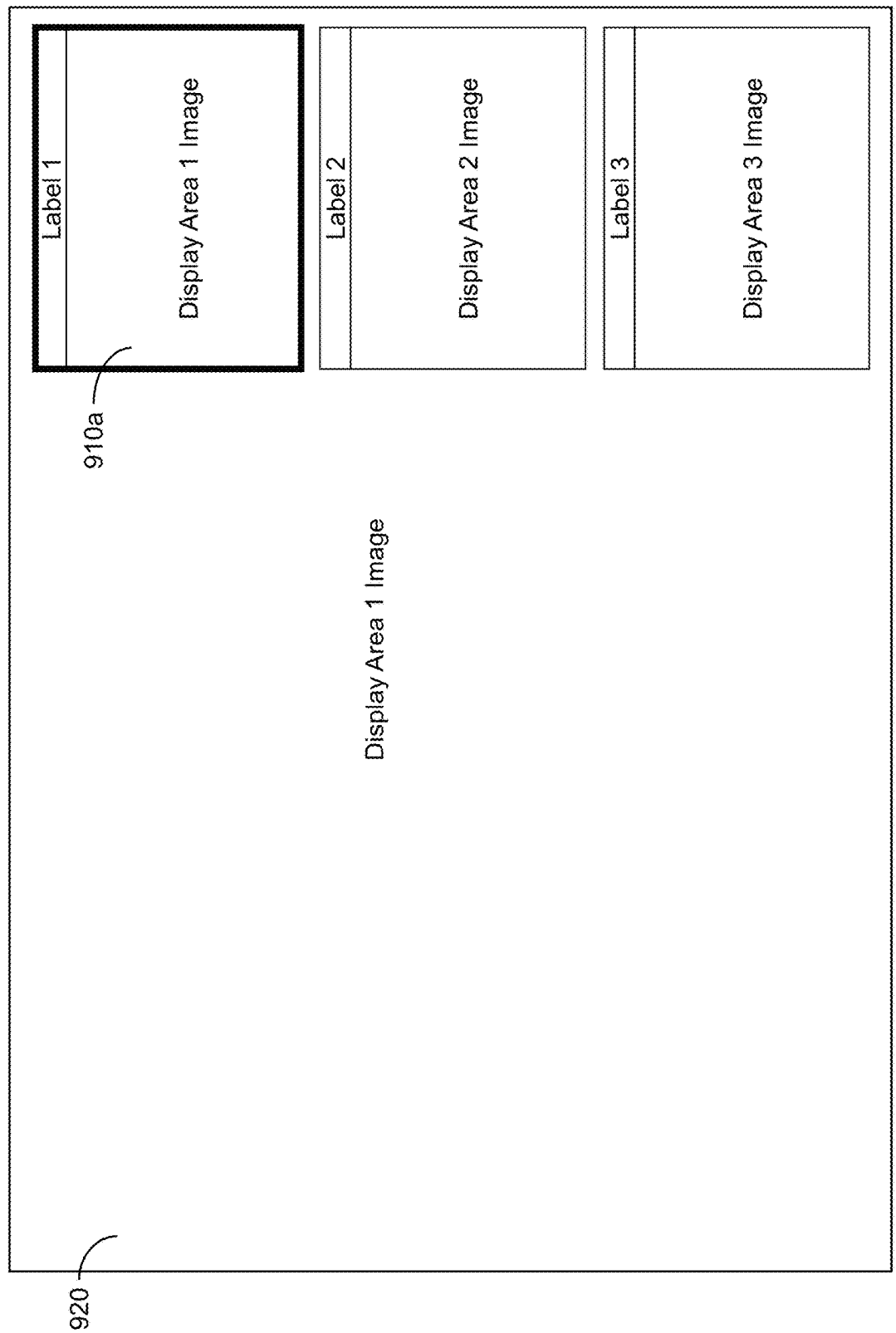
FIG. 9 is an example wireframe showing another arrangement of multiple display areas and one enlarged display area according to some embodiments of the present disclosure.
Figure 10:
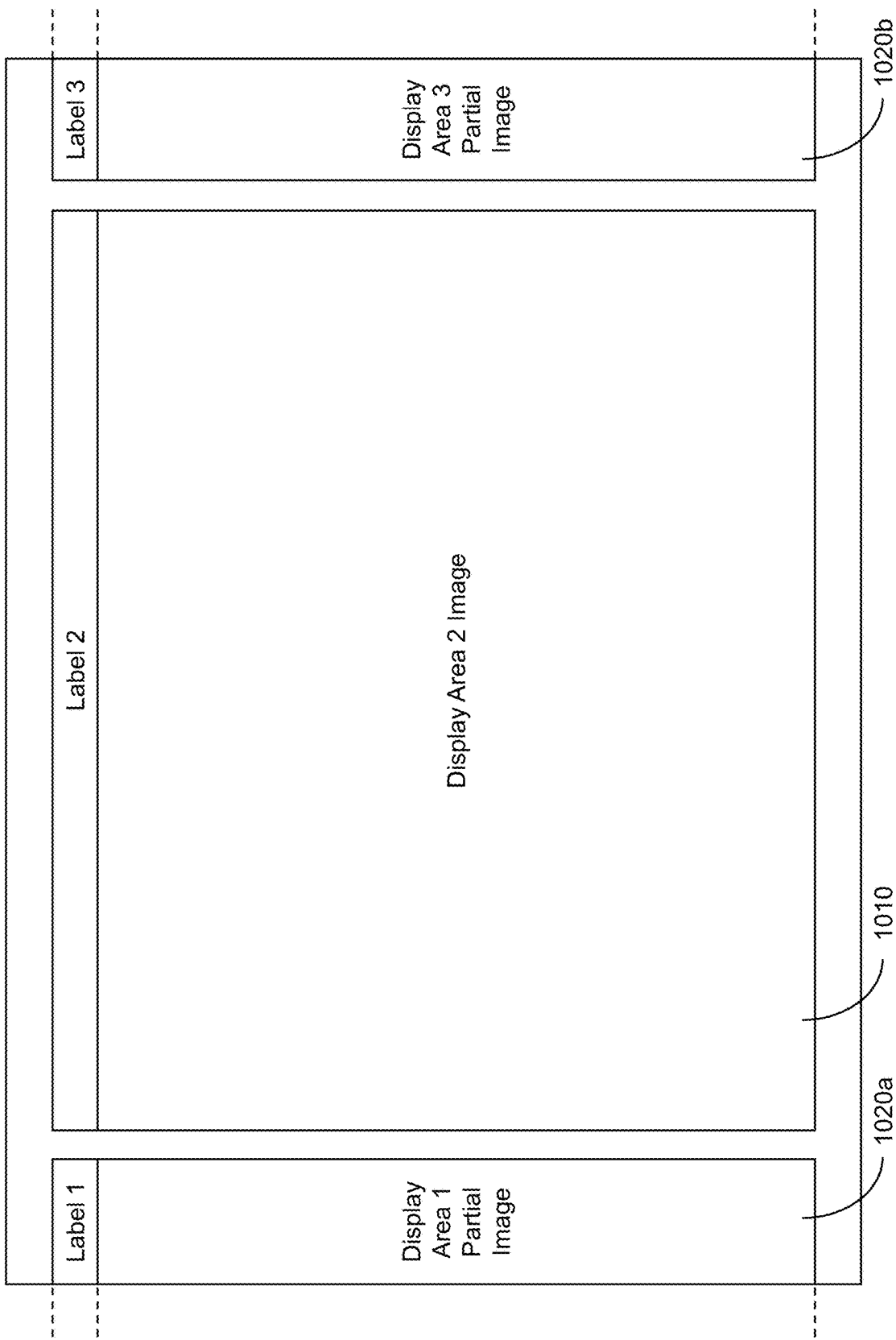
FIG. 10 is an example wireframe showing one enlarged display area and edges of other display areas according to some embodiments of the present disclosure.

The display assembler 230 receives the captured images of the display areas (e.g., the captured video streams) and generates a combined display that includes video streams of each of the display areas. The display assembler 230 outputs the combined display to another display area provided by the multi-display capture application or other application providing a combined display. The display assembler 230 may assemble the video streams in various different arrangements depending on the number of display areas selected by the user, whether the user has selected a particular display area to enlarge, and other settings selected by the user. For example, the display assembler 230 may generate an initial display that displays each of the video streams in a respective tile. Each tile may be labeled with the label entered by the user using the selection module 210. Two example tiled display arrangements are shown in FIGS. 6 and 7. From this initial tiled arrangement, the user may select one of the video streams to enlarge. In response to receiving the user selection (e.g., from the user control module 240), the display assembler 230 enlarges the selected video stream. The display assembler 230 may also move and/or re-size the tiles. For example, the display assembler 230 displays the full set of video streams along with the enlarged video streams, e.g., by moving the tile video stream tiles to a row or column along an edge of the combined display. Two example display arrangements with an enlarged display are shown in FIGS. 9 and 10.

A user may select display areas that have different aspect ratios. For example, computer screens commonly have 16:10 or 4:3 ratios. Application windows that are maximized have the aspect ratio of or near that of the screen. Application windows that are not maximized may have any aspect ratio, depending on the size of the window. To account for differently sized display areas, the display assembler 230 may have a standard aspect ratio size used for the tiles and enlarged display (e.g., 4:3). For display areas that do not fit this aspect ratio, the display assembler 230 may include buffer regions along the sides or along the top or bottom to fill out the tile. Alternatively, the display assembler 230 may select the size for each tile based on the aspect ratio of each display area. In some embodiments, the display assembler 230 selects an aspect ratio for the tiles based on the selected display areas, e.g., selecting an average aspect ratio, or selecting an aspect ratio of a plurality or majority of the selected display areas. Example buffer regions for a tiled display are shown in FIGS. 11-14. Furthermore, examples for handling an enlarged display area that does not match an aspect ratio of the multi-display capture application or multi-display capture feature are shown in FIGS. 13 and 14.

The user control module 240 enables a user to interact with the multi-display capture system 200 after display area selection. The user control module 240 may enable a user to select one of the display areas and enlarge the selected display area. For example, if the user moves a cursor over a tile for a particular display area, the user control module 240 may output a selectable option for the user to enlarge the display area in the tile, e.g., as a selectable icon overlayed on the tile or positioned near the tile. As another example, the user may click on any part of a display area tile to request that the display assembler 230 enlarge the display area. After a display area is enlarged, the user control module 240 may provide an option for a user to return to a display of the tiles without an enlarged area, e.g., a selectable "x" icon on the enlarged area. Furthermore, the user control module 240 enables the user to select a different one of the tiles to enlarge, and the display assembler 230 swaps the enlarged video stream with the video stream corresponding to the selected tile. As noted above, the display assembler 230 may display continuous video streams of each of the display areas in their respective tiles, so that the sharing and viewing users can view any changes in the tiled display areas as well as the enlarged display area.

As another example, the user control module 240 may provide options for a user to add or remove display areas from the combined display. For example, if the user moves a cursor over a tile for a particular display area, the user control module 240 may output a selectable option for the user to remove the tile and its display area, e.g., as a selectable "x" icon overlayed on the tile or positioned near the tile. The user control module 240 may display an icon to add a display area, e.g., to the right of a horizontal row of display areas. If the user control module 240 receives a selection of this icon, the selection module 210 may provide a selection interface, e.g., in a dialog window, similar to the selection interface described above and shown in FIGS. 3-5.

The user control module 240 may provide additional functionality for a user to control the display. For example, the user control module 240 may enable a user to switch between different view modes, e.g., to change the arrangement of the display area tiles (e.g., as a row along the top, bottom, or center of the combined display; as a column along either side or the center of the combined display; or in a gallery or grid view). As another example, the user control module 240 may allow a user to instruct the display assembler 230 to display one enlarged display area and along with edges of one or two neighboring display areas, as shown in FIG. 10. In addition to providing on-screen options to control the combined display, the user control module 240 may respond to various programmed keyboard shortcuts or other types of user input associated with various commands.

The data storage 250 stores data for the multi-capture display system 200 during and, in some embodiments, between sessions. The data storage 250 may store data in the memory and/or storage unit of the computer 110. During a session, the data storage 250 may temporarily store images captured by the display area capture module 220, e.g., in a buffer that is accessed by the display assembler 230. The data storage 250 stores user selections and settings received from the selection module 210 and user control module 240, e.g., display area labels and display settings.

In some embodiments, the data storage 250 stores user selections and/or settings during a first session of providing a combined display, and the selection module 210 retrieves the stored user selections or settings when a user initiates a second session of providing a combined display. For example, a multi-display capture application stores the number of display tiles, arrangement of display tiles, and labels for the display tiles when the user closes the application. When the user restarts the application, the selection module 210 retrieves the labels from the data storage 250, and the user can select a display area corresponding to each label. When the user has completed the selection process, the display assembler 230 retrieves the display arrangement from the data storage 250 and generates the combined display according to the saved display arrangement. This allows the user to more efficiently start a session similar to a previous session.

Example Display Area Selection

FIGS. 3 through 5 show example wireframes of user interfaces that enable a user to select display areas for the combined display. The user interfaces may be provided by the selection module 210.

FIG. 3 is an example wireframe of a selection interface that displays a set of selectable display areas 310. Each of the display areas 310 may correspond to a display screen connected to the computer 110 or an application window of an application executed by the computer 110. Each of the display areas 310 may include a fixed image or video stream of the screen or application window. The selection interface may further include a label, e.g., the application name, or a screen number, for each of the display areas 310. In this example, the selection interface includes five display areas 310. The number of display areas 310 depends on the computing environment. For example, in the environment shown in FIG. 1, the selection interface may provide six display areas in the selection interface: three corresponding to the three displays 115, 120, and 130, and three corresponding to the application windows 125, 132, and 134. If the computer 110 is connected to a video camera, this may be display as an additional display area 310.

The user selects a particular display area, e.g., display area 310a, to include in the combined display. In response to receiving the user selection of the display area 310a, the selection module 210 displays the user interface represented by the wireframe shown in FIG. 4. The selection module 210 visually distinguishes the selected display area 310a from the other display areas (e.g., display area 310b) to indicate that it has been selected. In this example, the selection module 210 draws a box 410 around the selected display area 310a. The selection module 210 further displays a label entry box 420 in which a user may type a label for the selected display area 310a. After entering the label, the user may select the button 430 to select another display area for inclusion in the combined display, or button 440 to complete the display area selection process.

As noted above, in some embodiments, a display area may be the contents of a tab of a tabbed application. If, for example, display area 310b represents a tabbed application (e.g., a web browser window), the selection module 210 may display the user interface represented by the wireframe shown in FIG. 5. The user interface enables a user to select a particular tab of the tabbed application. The user interface includes a tab selection box 510 that lists the available tabs 520. The available tabs 520 may be labeled with the tab names (e.g., website names), or other identifying information may be provided, such as an image of each tab. In response to receiving a user selection of one of the tabs (here, tab 520c), the selection module 210 visually distinguishes the selected tab 520 and displays a label entry box 530 in which a user may type a label for the selected tab 520c. After entering the label, the user may select the Done button 540 to return to the selection interface shown in FIG. 3.

Example Combined Display Arrangements

After the user selects the display areas, the display assembler 230 assembles the video streams of the selected displays and generates a combined display. Five example arrangements of combined displays are shown in FIGS. 6-10. A user may be able to toggle between different arrangements using user control options provided by the user control module 240, as described above.

FIG. 6 is an example wireframe of a user interface simultaneously displaying multiple display areas in a horizontal row. The user interface is a combined display of three display areas. Images of each of the display areas are displayed in a respective tile 610a, 610b, and 610c within the user interface. As noted above, images of the display areas may be captured and displayed as a video stream. The tiles 610 are arranged in a horizontal row across the combined display. This arrangement may be selected to replicate an emergency telecommunicator's computing environment, which typically has several screens arranged next to each other.

The labels entered by the user in the selection interface for each of the display areas are displayed proximate to the images of the respective display areas. In this example, a first label 620a for a first display area is displayed above a first tile 610a containing a captured image of the first display area. Second and third labels 620b and 620c are displayed above the second and third tiles 610b and 610c. In other embodiments, the labels 620 may be displayed underneath the respective tiles, overlaying the respective tiles, or in some other arrangement relative to the selected tiles.

FIG. 7 is an example wireframe of a user interface simultaneously displaying multiple display areas in a grid arrangement. In this example, four tiles 710 are arranged in a grid in the combined display, rather than in a horizontal row. The labels entered by the user in the selection interface for each of the display areas are displayed proximate to the images of the respective display areas, e.g., a first label 720a for the first display area is displayed above a first tile 710a containing a captured image of the first display area. The grid arrangement may be selected to replicate a computing environment with screens arranged in a grid formation, or to better utilize available screen area in the combined display.

While FIGS. 6 and 7 show three and four display areas, respectively, it should be understood that any number of display areas, e.g., two or more display areas, may be included in combined display. In some embodiments, the display assembler 230 selects a default arrangement for the tiles based on the number of display areas, e.g., selecting a grid arrangement if four or more display areas are selected, and a row arrangement if two or three display areas are selected.

Figure 8:
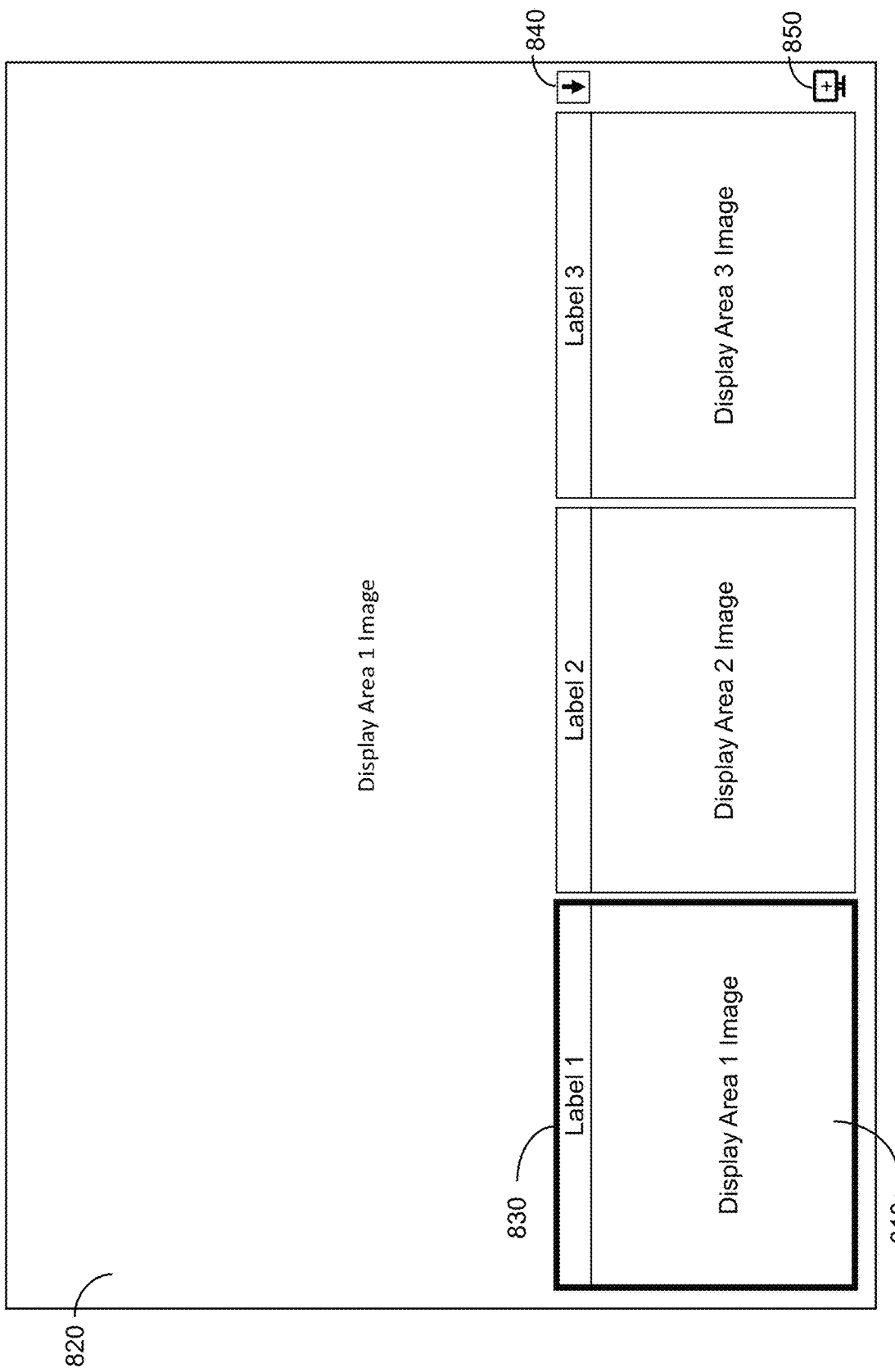
FIG. 8 is an example wireframe showing multiple display areas and one enlarged display area according to some embodiments of the present disclosure.

FIG. 8 is an example wireframe showing multiple display areas and one enlarged display area. In this example, the user has selected the first display area 810a to enlarge, e.g., by selecting the first tile 610a in FIG. 6. The display assembler 230 displays an enlarged image 820 of the first display area across the combined display. In this example, the enlarged image 820 is a full-screen image. The display assembler 230 displays the horizontal row of tiles shown in FIG. 6 along the bottom of the combined display and overlayed over a lower portion of the enlarged image 820. Furthermore, the display assembler 230 visually distinguishes the selected display area 810a, e.g., by highlighting a boundary of the tile containing the selected display area 810a. The display assembler 230 may use a thicker tile boundary to denote the selected display area, change the color of the tile boundary, or visually distinguish the tile containing the selected display area in another manner.

FIG. 8 also shows example selectable icons 840 and 850 for the user to control the arrangement of the combined display. If the user selects the minimize icon 840, the display assembler 230 may hid or shrink the tiles along the bottom of the combined display. For example, a user may temporarily hide or shrink the tiles to point out a user interface feature of the enlarged image 820 that is blocked by the tiles. If the tiles are shrunk or hidden, the user control module 240 may provide an on-screen icon that, if selected, causes the tiles to reappear or return to their original size. If the user selects the new display area icon 850, the selection module 210 provides a selection interface, e.g., in a dialog window, similar to the selection interface shown in FIG. 3, that allows the user to add an additional display area.

In some embodiments, on-screen control icons such as the icons 840 and 850 are visible to both the sharing user and the viewing users. The on-screen control icons may be selectable only by the sharing user, by both the sharing user and the viewing users, by a subset of the viewing users, or some other set of users. In some embodiments, the on-screen control icons are shown to the sharing user, and the control icons not shown to the viewing users or a portion of the viewing users.

The position of the tiles may be different in different embodiments, or based on different user settings. For example, FIG. 9 shows another example wireframe with a different arrangement of multiple display areas and one enlarged display area. In FIG. 9, the display assembler 230 displays the tiles of each of the display areas 910 as a vertical column along the left side of the combined display rather than horizontal row. As in FIG. 8, the selected display area 910a is visually highlighted, and an enlarged image 920 of the selected display area 910a is displayed across the combined display.

FIG. 10 is an example wireframe showing one enlarged display area along with the edges of other display areas. Rather than displaying the enlarged display area along with a full set of the selected display areas as tiles along an edge of the display, as shown in FIGS. 8 and 9, the multi-display capture system 200 may provide the context of an enlarged display by displaying larger partial images, also referred to as bleeds, along the sides of the combined display. In this example, the user has selected to enlarge the second display area 1010, which may correspond to the display area of the second tile 610b shown in FIG. 6. Enlarged partial images of the first and third display areas 1020a and 1020b flank the selected display area 1010 on either side. For example, one partial display area 1020a corresponds to the display area of the first tile 610a in FIG. 6, and another partial display area 1020b corresponds to the display area of the third tile 610c in FIG. 6. Displaying the partial display areas 1020a and 1020b provides context for the selected, full display area 1010, but does not provide full images of the unselected display areas 1020a and 1020b. The display areas 1010, 1020a, and 1020b may be considered enlarged tiles 610a-610c; due to the larger size, the left portion of the first display area 1020a and the right portion of the third display area 1020b extend off the combined display, as indicated by the dashed lines.

Example Combined Display Use Case

The combined displays generated by the multi-display capture system 200 may be especially useful for sharing multi-window or multi-screen applications. As noted above, one example of an application that typically extends across multiple screens and multiple windows is an emergency computer-aided dispatch (CAD) application. CAD applications have various windows, and in different settings, a telecommunicator may view different sets of windows across multiple screens. For example, CAD applications may include an incident map or tactical map showing the location of active incidents and various informational overlays; an incident grid or incident list listing incidents or calls handled by the telecommunicator or the telecommunicator's call center; a units grid listing units available for the telecommunicator to dispatch; and an interface with details of a particular call or incident; a chat interface for a telecommunicator to text with an emergency responder or a person reporting an emergency via text-to-9-1-1. These interfaces and/or other interfaces may be available to an emergency telecommunicator based on the telecommunicator's role (e.g., call-taking or dispatching), the responsibilities of the call center, the technical capabilities of the call center, and other factors.

Figure 11:
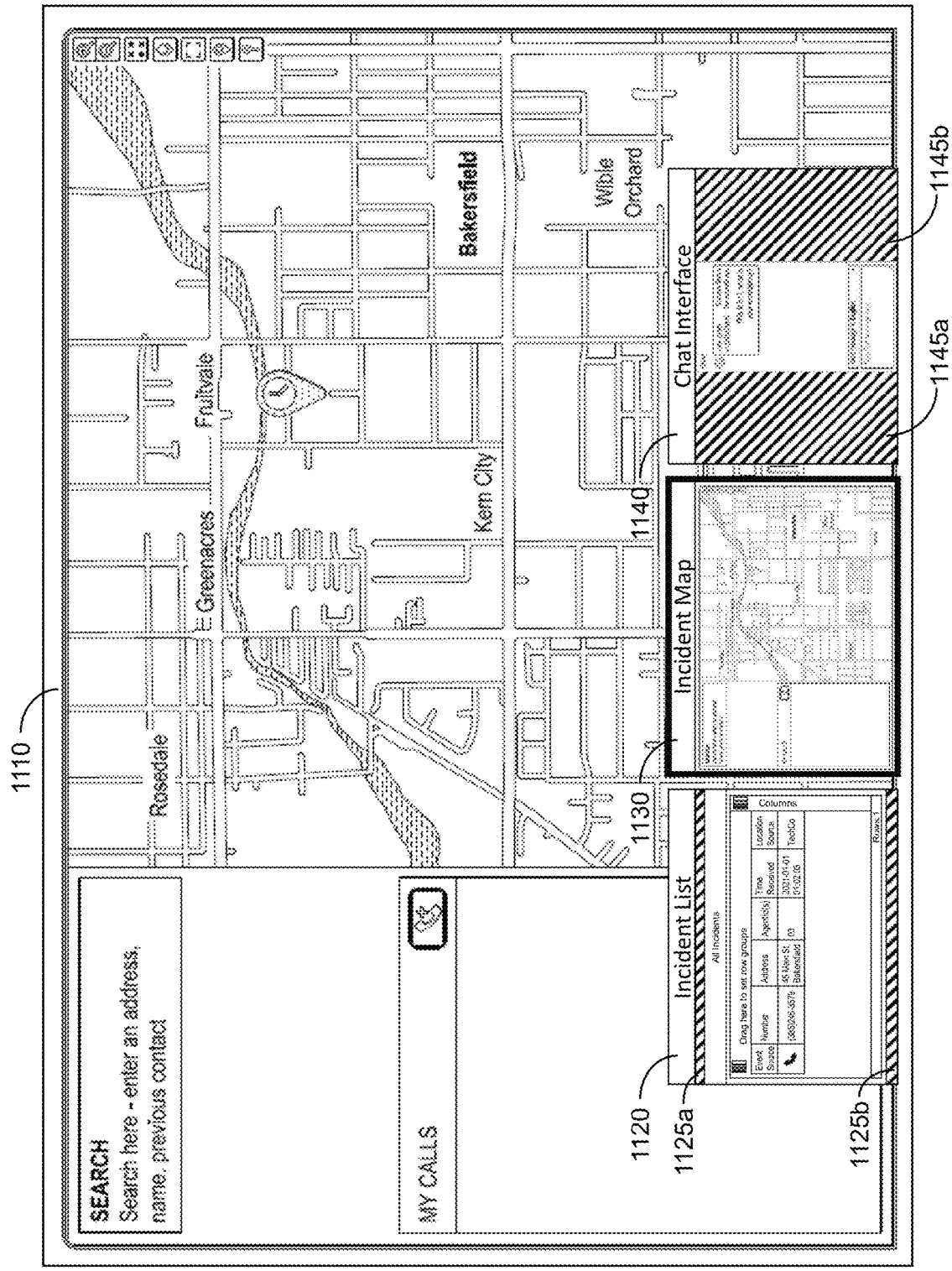
FIG. 11 is a user interface showing an enlarged incident map along with smaller displays of an incident list, the incident map, and a chat interface.
Figure 12:
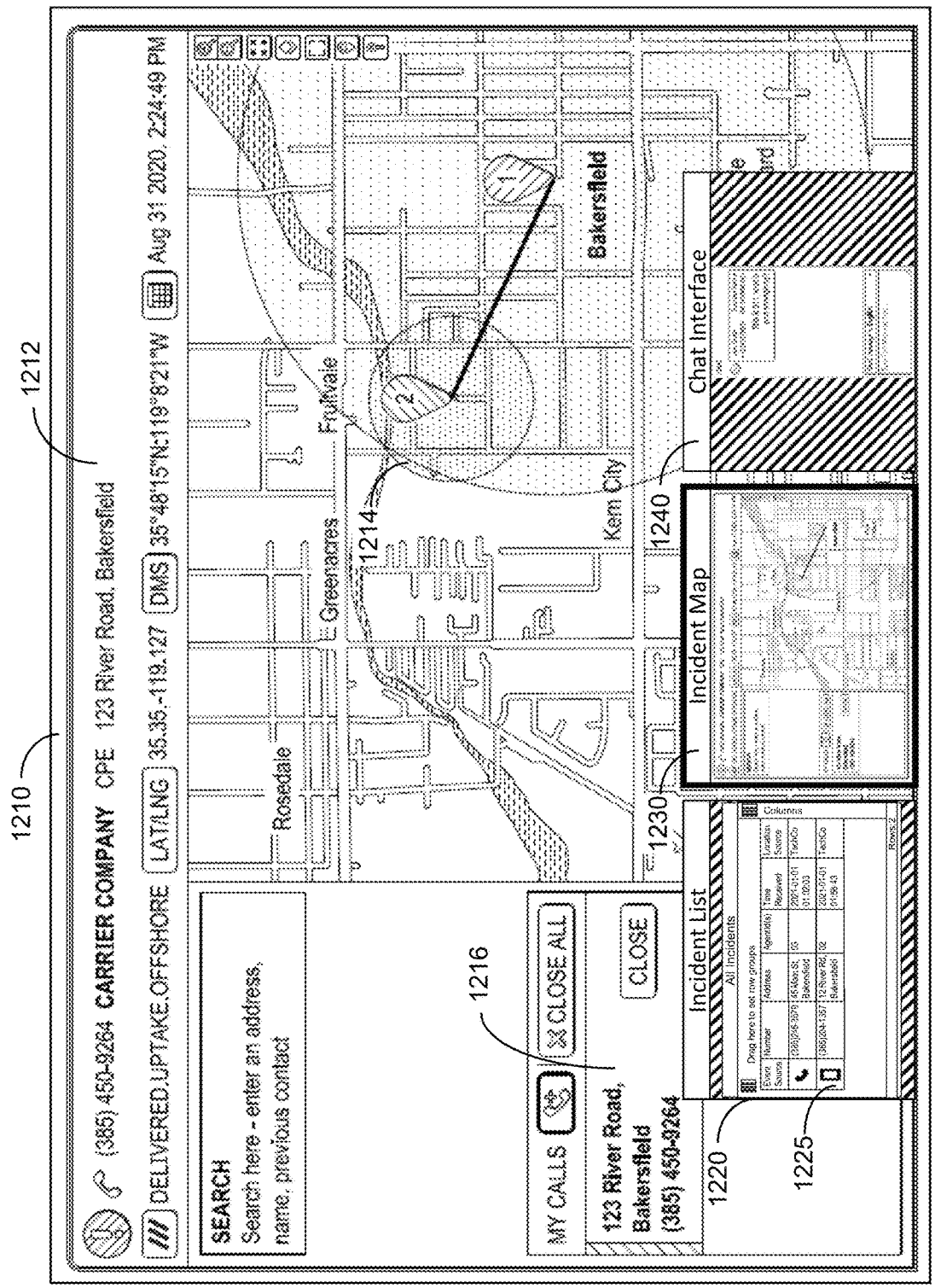
FIG. 12 is a user interface showing the displays of the incident map, incident list, and chat interface after a new call is received.
Figure 13:
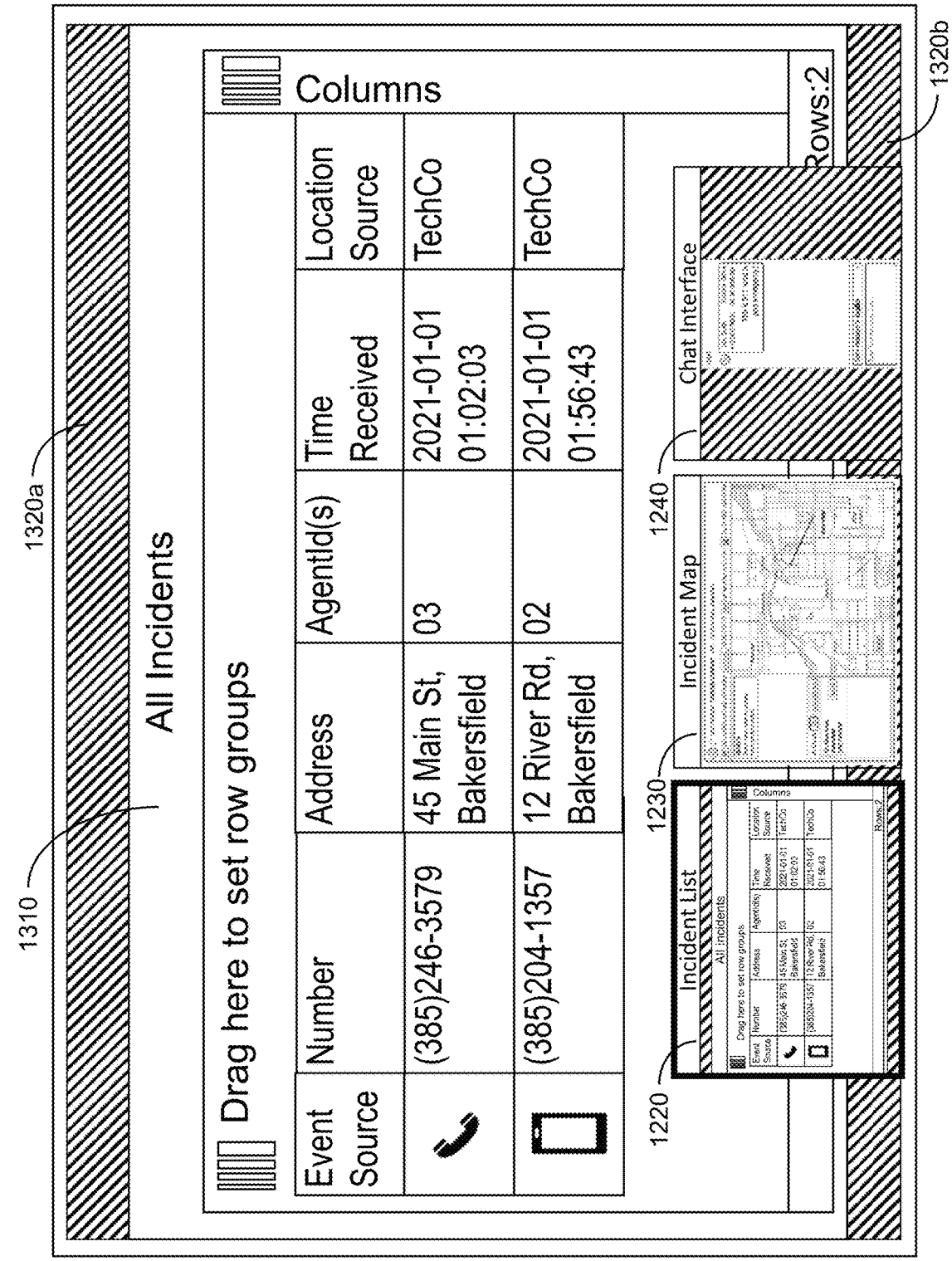
FIG. 13 is a user interface showing the incident map, incident list, and chat interface with the incident list enlarged.
Figure 14:
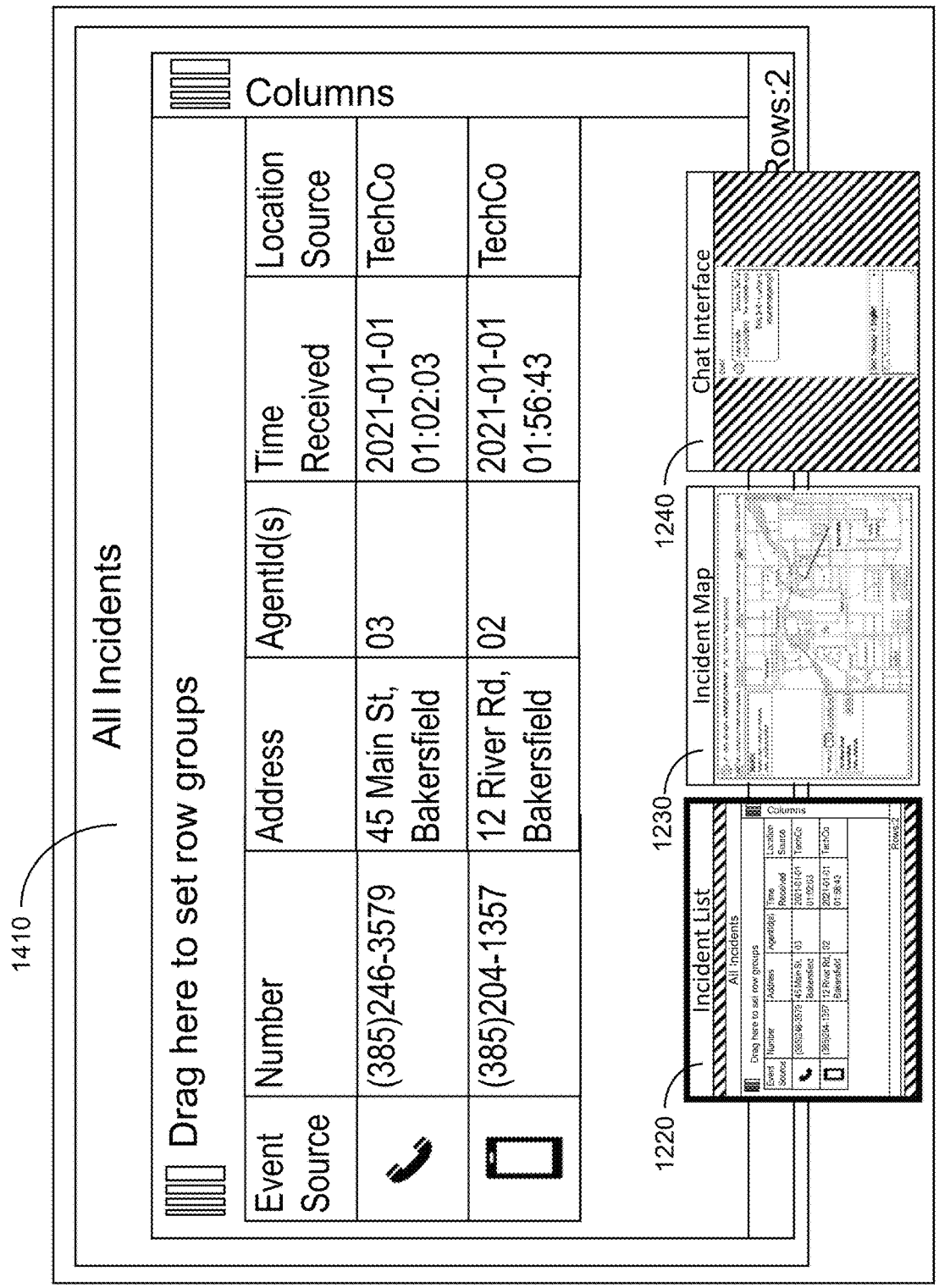
FIG. 14 is an alternate arrangement of the enlarged incident list shown in FIG. 13.

Several example combined displays showing display areas corresponding to an incident list, an incident map, and a chat interface are shown in FIGS. 11-14. FIG. 11 is a user interface showing an enlarged incident map 1110 along with smaller tiled displays of an incident list 1120, the incident map 1130, and a chat interface 1140. The incident map 1110 has a map along with a search box and a "my calls" box that displays calls handled by the telecommunicator. The enlarged incident map 1110 has the same content as the tiled display of the incident map 1130 but the enlarged incident map 1110 has a larger size. In this example, the incident map 1110 has the same aspect ratio as the default tile size of the display assembler 230 and of the combined display itself. However, the incident list 1120 and chat interface 1140 have different aspect ratios. To fit the incident list 1120 to the standard tile size, the display assembler 230 adds buffer bars 1125a and 1125b above and below the incident list 1120. To fit the chat interface 1140 to the standard tile size, the display generator adds buffer bars 1145a and 1145b to the left and right of the chat interface 1140.

FIG. 11 shows the three display areas at a first time, when one call is on the incident list 1120, and no active calls are being handled by the telecommunicator. FIG. 12 shows the same arrangement the enlarged incident map 1110 and tiled incident list 1120, incident map 1130, and chat interface 1140 at a second time, after a new call is received by the telecommunicator. In response to the telecommunicator answering the new call, the CAD application updates the incident map 1210 to include a bar 1212 with caller and location details along the top of the incident map 1210, call location pins 1214 on the map itself, and call location information 1216 in the "my calls" box. Each of these changes is also reflected in the smaller tiled incident map 1230. In other words, both the enlarged incident map 1210 and the tiled incident map 1230 update in real-time based on changes in the CAD application. Furthermore, the CAD application updates the incident list to include a row 1225 with details of the newly received call. The incident list 1220 in the combined display also updates in real-time based on changes to the CAD application.

As described above, the user may select the tile for the incident list 1220 or the tile for the chat interface 1240 to switch the enlarged image shown in the combined display. FIG. 13 is a user interface showing the incident list 1220, incident map 1230, and chat interface 1240 with the incident list enlarged. The enlarged incident list 1310 is shorter and wider than the aspect ratio of the combined display. To fit the enlarged incident list 1310 to the size of the combined display, the display assembler 230 adds buffer bars 1320a and 1320b above and below the enlarged incident list 1310.

FIG. 14 provides an alternate arrangement of the enlarged incident list shown in FIG. 13. In this arrangement, the enlarged incident list 1410 is located towards the top of the combined display, to reduce the overlap between the tiled display areas 1220, 1230, and 1240 and the enlarged incident list 1410. This provides greater visibility of the enlarged incident list 1410. In some embodiments, the display assembler 230 optimizes the position of the enlarged display area and the tiled display areas to maximize the visibility of the display areas. As another example, if the chat interface 1240 is selected for the enlarged image, the display assembler 230 may switch to the tile arrangement shown in FIG. 9.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

What is claimed is:

1. A method comprising:
   generating, by an emergency dispatch application executing on a computing device, a plurality of display areas;
   receiving a user selection, at the computing device, of a first display area of the plurality of display areas of an emergency dispatch application;
   receiving a user selection, at the computing device, of a second display area of the plurality of display areas of the emergency dispatch application;
   simultaneously capturing, by the computing device, a first video stream of the first display area and a second video stream of the second display area;
   generating, by the computing device, a combined display comprising the captured first video stream of the first display area and the captured second video stream of the second display area;
   providing the combined display in a third display area generated by the computing device, the third display area separate from the first display area and the second display area;
   streaming the combined display from the computing device for display by one or more other computing devices;
   receiving a user selection of one of the first video stream and the second video stream; and
   in response to the user selection, displaying, by the computing device, an enlarged view of the selected video stream in the combined display, the combined display including a first portion including the enlarged view and a second portion including the captured first video stream and the captured second video stream.

2. The method of claim 1, wherein the first display area is one of an incident list, an incident map, a units grid, a call detail window, or a chat interface, and the second display area is another one of an incident list, an incident map, a units grid, a call detail window, or a chat interface.

3. The method of claim 1, further comprising providing a display area selection interface comprising options corresponding to a plurality of available display areas of the emergency dispatch application, wherein receiving the user selection of the first display area comprises receiving a selection of one of the options of the plurality of available display areas in the display area selection interface.

4. The method of claim 1, further comprising:
   receiving, as user input, a first label for the first display area and a second label for the second display area; and
   displaying, in the third display area, the first label proximate to the first video stream and the second label proximate to the second video stream.

5. The method of claim 1, wherein, in the combined display, the first video stream is displayed in a first tile and the second video stream is displayed in a second tile, the first and second tiles arranged in a horizontal row of tiles in the second portion of the combined display.

6. The method of claim 5, wherein, in response to the user selection, the horizontal row of tiles is displayed along the bottom of the third display area, the horizontal row of tiles of the second portion overlaying the first portion including the enlarged selected video stream.

7. The method of claim 5, wherein receiving a user selection of one of the first video stream and the second video stream comprises receiving a selection of a tile in the horizontal row of tiles, the method further comprising visually distinguishing a tile boundary of the selected tile in response to the selection of the tile.

8. A multi-display capture system comprising a memory and processing circuitry, the memory comprising instructions, when executed by the processing circuitry, for:
   generating, by an emergency dispatch application executing on a computing device, a plurality of display areas;
   receiving a user selection, at the computing device, of a first display area of the plurality of display areas of an emergency dispatch application;
   receiving a user selection, at the computing device, of a second display area of the plurality of display areas of the emergency dispatch application;
   simultaneously capturing, by the computing device, a first video stream of the first display area and a second video stream of the second display area;
   generating, by the computing device, a combined display comprising the captured first video stream of the first display area and the captured second video stream of the second display area;
   providing the combined display in a third display area generated by the computing device, the third display area separate from the first display area and the second display area;

streaming the combined display from the computing device for display by one or more other computing devices;

receiving a user selection of one of the first video stream and the second video stream; and in response to the user selection, displaying, by the computing device, an enlarged view of the selected video stream in the combined display, the combined display including a first portion including the enlarged view and a second portion including the captured first video stream and the captured second video stream.

9. The system of claim 8, wherein the first display area is one of an incident list, an incident map, a units grid, a call detail window, or a chat interface, and the second display area is another one of an incident list, an incident map, a units grid, a call detail window, or a chat interface.

10. The system of claim 8, the instructions further executable by the processor for providing a display area selection interface comprising options corresponding to a plurality of available display areas of the emergency dispatch application, wherein receiving the user selection of the first display area comprises receiving a selection of one of the options of the plurality of available display areas in the display area selection interface.

11. The system of claim 8, the instructions further executable by the processor for:

receiving, as user input, a first label for the first display area and a second label for the second display area; and displaying, in the third display area, the first label proximate to the first video stream and the second label proximate to the second video stream.

12. The system of claim 8, wherein, in the combined display, the first video stream is displayed in a first tile and the second video stream is displayed in a second tile, the first and second tiles arranged in a horizontal row of tiles in the second portion of the combined display.

13. The system of claim 8, wherein, in response to the user selection, the horizontal row of tiles is displayed along the bottom of the third display area, the horizontal row of tiles of the second portion overlaying the first portion including the enlarged selected video stream.

14. The system of claim 8, wherein receiving a user selection of one of the first video stream and the second video stream comprises receiving a selection of a tile in the horizontal row of tiles, the method further comprising visually distinguishing a tile boundary of the selected tile in response to the selection of the tile.

* * * * *